United States Patent
Wu et al.

(10) Patent No.: US 7,777,624 B2
(45) Date of Patent: Aug. 17, 2010

(54) DIRECTION OF TRAVEL MOTION SENSOR

(75) Inventors: Xiaodong Wu, Roseville, CA (US);
Leslie K. Green, Applegate, CA (US);
James N. Helland, Agoura Hills, CA (US)

(73) Assignee: Honeywell International Inc.,
Morristown, NJ (US)

( * ) Notice: Subject to any disclaimer, the term of this patent is extended or adjusted under 35 U.S.C. 154(b) by 364 days.

(21) Appl. No.: 11/862,078

(22) Filed: Sep. 26, 2007

(65) Prior Publication Data

US 2009/0224913 A1    Sep. 10, 2009

(51) Int. Cl.
*G08B 13/18* (2006.01)
(52) U.S. Cl. ............... 340/554; 342/28; 367/93
(58) Field of Classification Search ......... 340/554; 367/93; 342/28
See application file for complete search history.

(56) References Cited

U.S. PATENT DOCUMENTS

| | | | | |
|---|---|---|---|---|
| 3,947,834 | A * | 3/1976 | Gershberg et al. | 340/554 |
| 4,286,260 | A * | 8/1981 | Gershberg et al. | 340/554 |
| 4,697,184 | A * | 9/1987 | Cheal et al. | 342/28 |
| 4,774,651 | A * | 9/1988 | El-Ibiary et al. | 700/71 |
| 4,857,912 | A * | 8/1989 | Everett et al. | 340/508 |
| 5,136,298 | A | 8/1992 | Williams | |
| 5,287,111 | A | 2/1994 | Shpater | |
| 5,343,404 | A * | 8/1994 | Girgis | 702/72 |
| 5,936,524 | A * | 8/1999 | Zhevelev et al. | 340/552 |
| 6,380,882 | B1 * | 4/2002 | Hegnauer | 342/28 |
| 6,677,887 | B2 * | 1/2004 | Harman | 342/28 |
| 6,700,528 | B2 * | 3/2004 | Williams et al. | 342/28 |
| 7,027,355 | B2 * | 4/2006 | Baldwin et al. | 367/93 |
| 7,119,737 | B2 | 10/2006 | Tsuji | |
| 2004/0130969 | A1 * | 7/2004 | Baldwin et al. | 367/93 |
| 2004/0212494 | A1 * | 10/2004 | Stilp | 340/539.1 |
| 2006/0221061 | A1 * | 10/2006 | Fry | 345/173 |
| 2007/0176765 | A1 | 8/2007 | Babich et al. | |
| 2008/0309488 | A1 * | 12/2008 | Icove et al. | 340/552 |
| 2009/0224913 | A1 * | 9/2009 | Wu et al. | 340/554 |

OTHER PUBLICATIONS www.security.honeywell.com/hsce visited on May 15, 2007.
www.security.honeywell.com/hsce/products/sensor/mo/re/18987.html visited on May 15, 2007.
www.security.honeywell.com/hsce/products/sensor/mo/co/19018.html visited on May 15, 2007.
www.security.honeywell.com/hsce/products/sensor/mo/co/19008.html visited on May 15, 2007.

* cited by examiner

*Primary Examiner*—Daniel Wu
*Assistant Examiner*—Bradley E Thompson
(74) *Attorney, Agent, or Firm*—Husch Blackwell Sanders Welsh & Katz

(57) ABSTRACT

A microwave direction of travel detector and method of detecting the direction of an intruder in a protected region. The microwave direction of travel detector transmits and receives, by a microwave transceiver a microwave signal directed toward a protected area. The microwave return signal is modulated by a moving target to produce a Doppler signal. The microcontroller monitors the output of the amplifier chain and stores the signal and compares it with previously stored signals. If the amplitude is increasing or decreasing over a preset time period, this would indicate that the target it approaching or receding respectively and an alarm would be generated by the microcontroller.

7 Claims, 1 Drawing Sheet

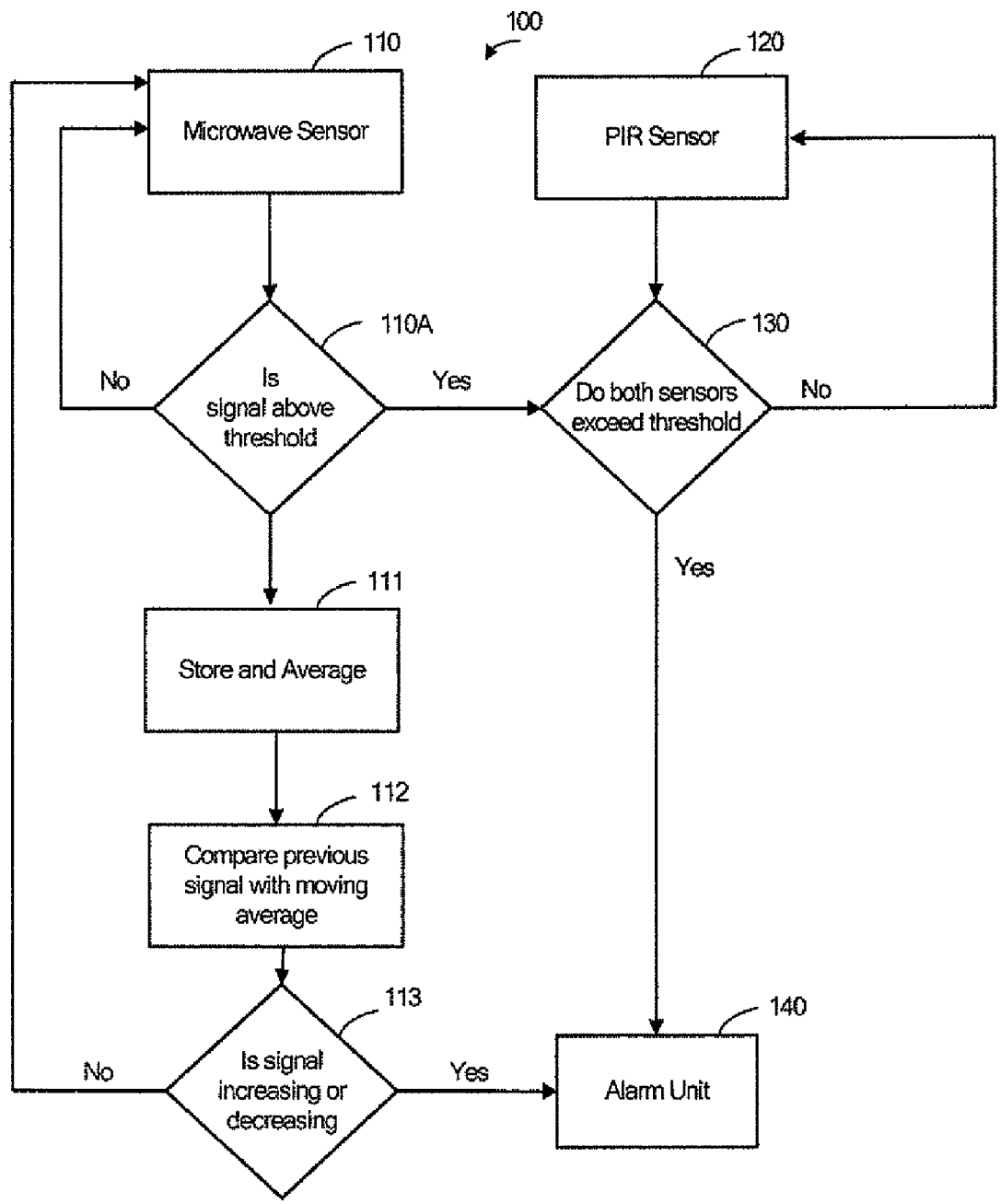

DIRECTION OF TRAVEL MOTION SENSOR

CROSS-REFERENCE TO RELATED APPLICATIONS

The present invention is related to the following commonly-owned, co-pending United States patent Applications filed on even date herewith, the entire contents and disclosures of each of which are expressly incorporated by reference herein as if fully set forth herein: U.S. patent application Ser. No. 11/862,071, for "MICROWAVE DIRECTION DETECTOR BY PARALLEL SAMPLING" and patent application Ser. No. 11/862,076, for "DIRECTION OF TRAVEL MOTION DETECTOR WITH AUTOMATIC GAIN CONTROL"

BACKGROUND OF THE INVENTION

Field of Invention

The present invention relates generally to dual technology motion sensors employed in the security industry to detect intruders in a protected area and more particularly, to a method of sensing the direction of travel of an intruder in a protected area.

Dual technology motion sensors for intrusion detection, such as Honeywell's DUAL TEC® Series Sensors include a passive infrared radiation (PIR) detector and a microwave (MW) detector, both of which are employed simultaneously to monitor an area for intrusions.

A MW sensor transmits a microwave signal toward a protected region and in the event that an intruder (target) passes within the protected region, the microwave signal reflected from such intruder (echo) are modulated due to the Doppler Effect. When the microwave signal is reflected by a moving target there is a shift in the reflected signals frequency. This is called the Doppler Effect. This shift is directly proportional to the targets velocity relative to the sensor. All Doppler sensors use this principle.

In dual technology sensors, to minimize false alarms the PIR and the microwave technologies compliment each other. A MW sensor employs the Doppler principle where a microwave signal is emitted toward a protected area resulting in a Doppler signal when a moving target is detected. In particular, to detect motion a microwave sensor is monitored for a Doppler signal. For example, if an intruder (target) passes within the protected area, the microwave signals are reflected from the intruder (echo). In other words, the echoed microwave signal is modulated due to the Doppler Effect, where the microwave signal is reflected by the moving target because there is a shift in the reflected signals frequency. This shift is directly proportional to the targets velocity relative to the sensor. Moreover, MW sensors may detect an intruder in the protected area, but without verification from the PIR sensor, no alarm is generated. A short-coming of the dual technology sensor is when one technology detects an intruder but the other technology doesn't then no alarm is generated.

SUMMARY OF THE INVENTION

The present invention provides a method of detecting direction of travel of a target in a protected region using microwave direction of travel sensing and generating an alarm when the PIR fails to detect an intruder In this invention a microwave direction of travel detector comprises, a microwave transceiver for transmitting and receiving a microwave signal directed toward a protected area that outputs a Doppler Signal when a moving target is seen, an amplifier chain consisting of one or more amplifiers that is sampled by the microcontroller. The microcontroller monitors the output of the amplifier chain and stores the signal and compares it with previously stored signals. If the amplitude is increasing or decreasing over a preset time period, this would indicate that the target it approaching or receding respectively and an alarm would be generated by the microcontroller. If the threshold is not reached by any other amplifier, than it is determined that the target is not moving toward or away from the sensor. In place of a microcontroller the monitoring may be accomplished using a DSP, ASIC or an FPGA chip.

BRIEF DESCRIPTION OF THE DRAWINGS

These and other features, benefits and advantages of the present invention will become apparent by reference to the following text figures, with like reference numbers referring to like structures across the views, wherein:

The FIGURE illustrates a flow chart depicting a method for detecting the direction of travel of an intruder by sensing an area to be monitored, according to one embodiment of the present invention.

DETAILED DESCRIPTION OF THE INVENTION

With reference to the FIGURE a novel method of detecting the direction of travel of an intruder by sensing an area to be monitored will be described.

According to this invention, a microwave transceiver transmits and receives a microwave signal toward a protected area that outputs a Doppler signal when a moving target is seen. The rest of the circuitry provides for collecting and storing the Doppler signal, which is updated periodically from microwave circuitry and compares the stored Doppler signal to a subsequent Doppler signal to determine if the signal is getting stronger or weaker indicating an approaching target or a receding target. If the PIR circuitry does not detect a target, than the microcontroller would generate and alarm based on the microwave only technology. This would give the sensor two methods for determining if there is a motion in the protected area. One method is the current method, which is when the PIR circuit and the microwave circuit both indicate a motion. The second method is when the microwave detects and approaching or receding target, but the PIR doesn't.

As can be seen in the FIGURE, a dual technology sensor unit 100 is provided which may includes a microcontroller, FPGA or DSP (not shown) for determining whether an intruder is within a protected area using Microwave and PIR detection technology. In addition, a memory is provided in the sensor unit 100 for storing the Doppler signal strength information from the microwave transceiver.

The present invention discloses two methods of intruder detection; a first method requires simultaneous detection by both a PIR sensor 120 and microwave sensors 110 to confirm that an intruder 130 is in a protected area and sends an alarm 140 to a control panel (not shown). A second method provides that if the PIR sensor 120 fails to detect an intruder 110A, the microwave sensor 110 would output a Doppler signal that the microcontroller 110 would store 111 and compare periodically in a moving average decision function 111-112. If the moving average function indicates an increasing/decreasing Doppler signal 113, then an alarm 140 is triggered representing an approaching target or receding target and is generated without the PIR reinforcement.

The above described moving average decision function 111-112 can employ one of two sampling techniques; parallel sampling of Doppler gain of the output of a plurality of cascading amplifiers or series sampling of the feedback of each variable gain amplifier as described in co-pending applications U.S. patent application Ser. No. 11/862,071, for "MICROWAVE DIRECTION DETECTOR BY PARALLEL SAMPLING" and U.S. patent application Ser. No. 11/862,076, for "DIRECTION OF TRAVEL MOTION DETECTOR WITH AUTOMATIC GAIN CONTROL." The time allotted for sampling depending on the method of sampling employed (parallel or series) as known to those skilled in the art. In addition, The above described moving average decision function 111-112 can receive an output from a fix amplifier as known to those skilled in the art.

As will be readily apparent to those skilled in the art, the present invention or aspects of the invention can be realized in hardware, or as some combination of hardware and software. A typical combination of hardware and software could be to analyze and carry out the method described herein, with the controller being an ASIC, DSP or FPGA chip. This method could be used in microwave only sensors or dual technology sensors using microwave and some other technology such as ultrasonic.

As will be readily apparent to those skilled in the art, the present invention or aspects of the invention can be realized in hardware, or as some combination of hardware and software. Any kind of computer/server system(s)- or other apparatus adapted for carrying out the methods described herein—is suited. A typical combination of hardware and software could be a general-purpose computer system with a computer program that, when loaded and executed, carries out methods described herein. Alternatively, a specific use computer, containing specialized hardware for carrying out one or more of the functional tasks of the invention, could be utilized.

The present invention or aspects of the invention can also be embodied in a computer program product, which comprises all the respective features enabling the implementation of the methods described herein, and which—when loaded in a computer system—is able to carry out these methods. Computer program, software program, program, or software, in the present context mean any expression, in any language, code or notation, of a set of instructions intended to cause a system having an information processing capability to perform a particular function either directly or after either or both of the following: (a) conversion to another language, code or notation; and/or (b) reproduction in a different material form.

The present invention can also be embodied as a program on a computer-readable recording medium. Examples of the computer-readable recording medium include but are not limited to Compact Disc Read-Only Memory (CD-ROM), Random-Access Memory (RAM), floppy disks, hard disks, and magneto-optical disks.

While there has been shown and described what is considered to be preferred embodiments of the invention, it will, of course, be understood that various modifications and changes in form or detail could readily be made without departing from the spirit of the invention. It is therefore intended that the scope of the invention not be limited to the exact forms described and illustrated, but should be construed to cover all modifications that may fall within the scope of the appended claims.

What is claimed is:

1. A method of sensing the direction of travel of an intruder in a protected area, said method comprising the steps of:
a microwave (MW) motion detector transmitting a microwave signal toward a protected area;
the microwave (MW) motion detector receiving a MW Doppler signal reflected from a target in the protected area;
comparing the received MW Doppler signal to a predetermined threshold, wherein, if the MW Doppler signal is less than the threshold signal, storing the MW Doppler signal in non-volatile memory; and
averaging all MW Doppler signals stored in said non-volatile memory and generating a moving average as new MW Doppler signals are received, wherein, if the moving average is increasing or decreasing generating an alarm indicating said intruder in said protected area.

2. The method of sensing the direction of travel of an intruder in a protected area of claim 1, wherein the step of comparing the received MW Doppler signal to a predetermined threshold includes the step of:
comparing each said received MW Doppler signal with the output of a PIR sensor to determine if said alarm should be triggered, wherein if both the MW motion detector and the PRI sensor detect motion, generating an alarm.

3. The method of sensing the direction of travel of an intruder in a protected area of claim 2, wherein a MW Doppler signal is received periodically and compared with the moving average to determine if the signal is getting stronger or weaker indicating an approaching target or a receding target.

4. The method of sensing the direction of travel of an intruder in a protected area of claim 1, wherein said step of receiving a MW Doppler signal includes the steps of either parallel sampling of gain information collected from the output of each stage of a plurality of cascading amplifiers or series sampling the feedback of a plurality of variable gain amplifiers.

5. The method of sensing the direction of travel of an intruder in a protected area of claim 1, wherein said direction of travel detection method operates in two modes;
a first mode, wherein an alarm is triggered if both a PRI sensor and a microwave sensor detector motion; and
a second mode, wherein an alarm is triggered if said microwave sensor detects motion and a direction of travel of said target.

6. The direction of travel detection method of claim 5, wherein the microwave sensor can identify said intruder in different zones.

7. A computer program storage device, readable by machine, tangibly embodying a program of instructions executable by a machine for sensing the direction of travel of an intruder in a protected area by a dual technology sensor, said method comprising the steps of:
a microwave (MW) motion detector transmitting a microwave signal toward a protected area;
the microwave (MW) motion detector receiving a MW Doppler signal reflected from a target in the protected area;
comparing the received MW Doppler signal to a predetermined threshold, wherein, if the MW Doppler signal is less than the threshold signal, storing the MW Doppler signal in non-volatile memory;
averaging all MW Doppler signals stored in said non-volatile memory and generating a moving average as new MW Doppler signals are received, wherein, if the moving average is increasing or decreasing generating an alarm indicating said intruder in said protected area.

* * * * *